United States Patent [19]

Walimaa et al.

[11] Patent Number: 5,547,330
[45] Date of Patent: Aug. 20, 1996

[54] ERGONOMIC THREE AXIS POSITIONER

[76] Inventors: Edsel J. Walimaa, 15015 S. 7th St., Phoenix, Ariz. 85048; Hugh N. Grady, Jr., 13236 N. 7th St., Unit 4290, Phoenix, Ariz. 85022

[21] Appl. No.: 310,384

[22] Filed: Sep. 22, 1994

[51] Int. Cl.⁶ .................................................. B65G 35/00
[52] U.S. Cl. .................................... 414/749; 269/71
[58] Field of Search .......................... 414/749, 772; 269/71, 73, 207; 248/184, 657, 661; 74/490.12; 359/393

[56] References Cited

U.S. PATENT DOCUMENTS

| | | | |
|---|---|---|---|
| 3,046,006 | 7/1962 | Kulicke, Jr. | 269/60 |
| 3,652,146 | 3/1972 | George | 359/393 X |
| 4,193,317 | 3/1980 | Oono et al. | 74/479 |
| 4,652,095 | 3/1987 | Mauro | 269/73 X |
| 5,427,349 | 6/1995 | Obrecht | 248/657 |

FOREIGN PATENT DOCUMENTS 2186706  8/1987  United Kingdom ............ 359/393

*Primary Examiner*—Donald W. Underwood
*Attorney, Agent, or Firm*—Cahill, Sutton & Thomas P.L.C.

[57] ABSTRACT

A positioner for moving an article along three mutually perpendicular axes includes a first slide coupled to a second slide by a first sliding joint, a third slide coupled to the second slide by a second sliding joint, and a base plate coupled to the third slide by a third sliding joint. The three sliding joints are mutually perpendicular. A first rack and pinion mechanism moves the first slide relative the second slide, a second rack and pinion mechanism moves the third slide relative to the base plate, and a carriage engaging a threaded shaft moves the second slide relative to the third slide. The pinion gears are mounted on shafts parallel to the threaded shaft and the three shafts extend from opposite sides of the positioner. A knob is attached to each end of the shafts for rotating the shafts to operate the positioner. The sliding joints are preferably dovetail joints, each of which includes a shim for adjusting the friction of the joint.

10 Claims, 2 Drawing Sheets

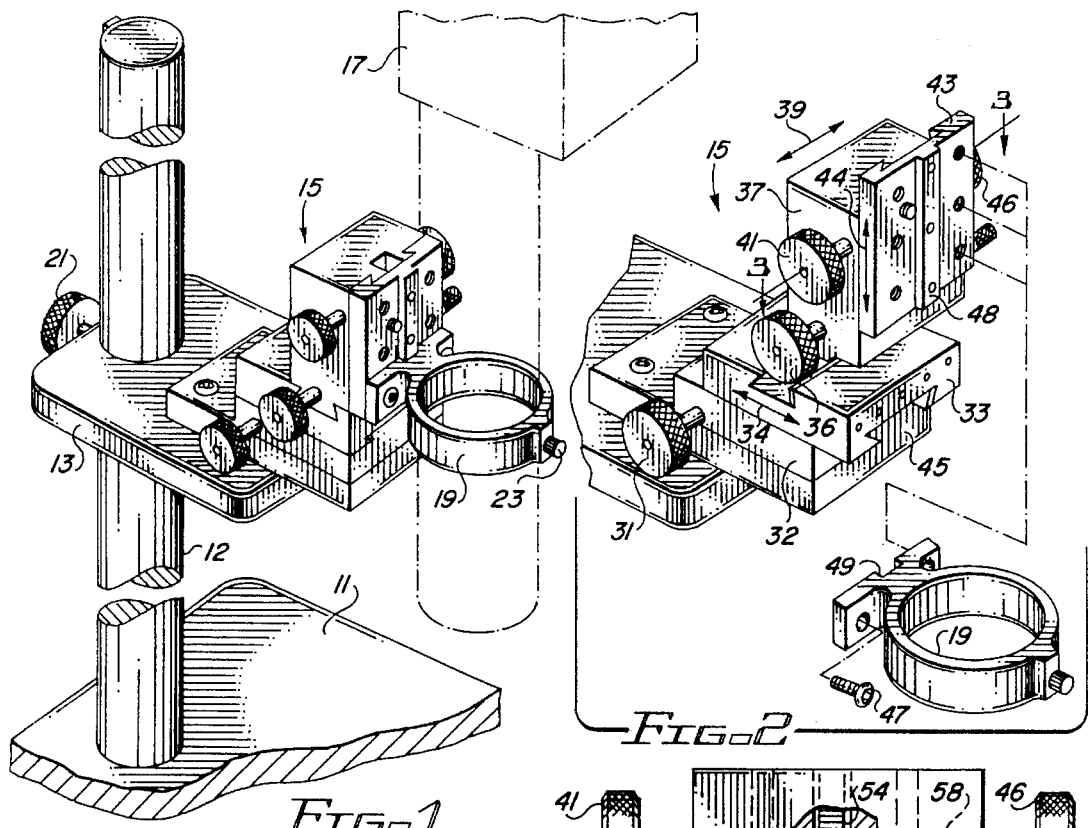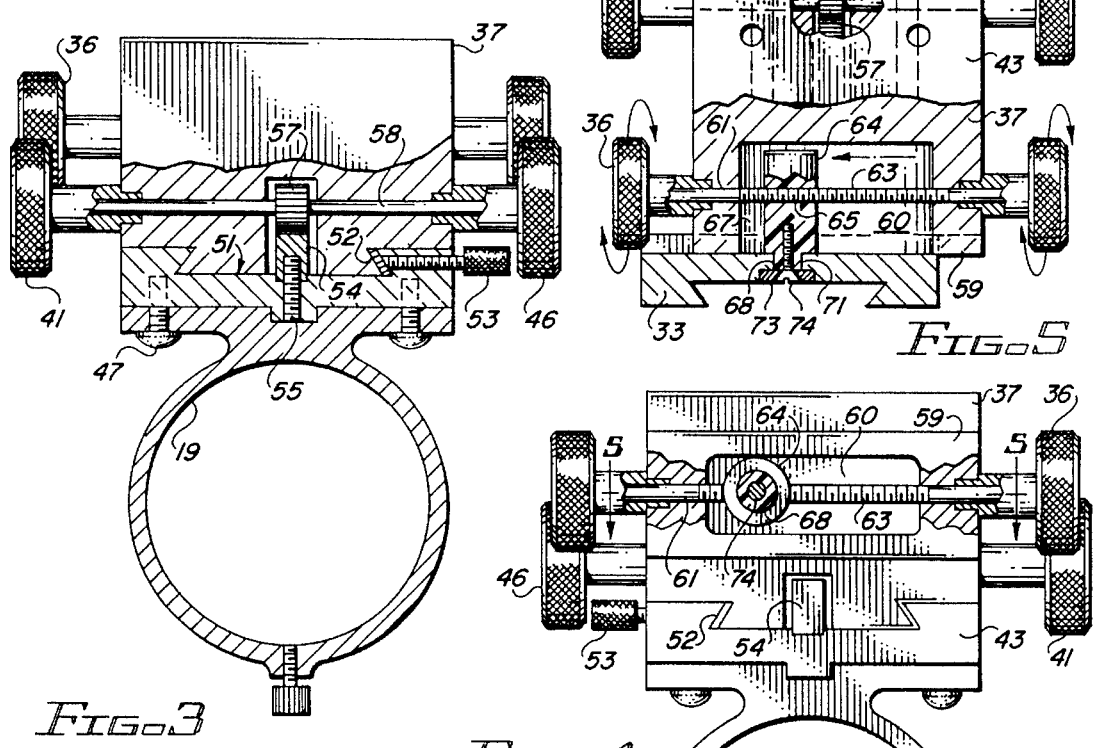

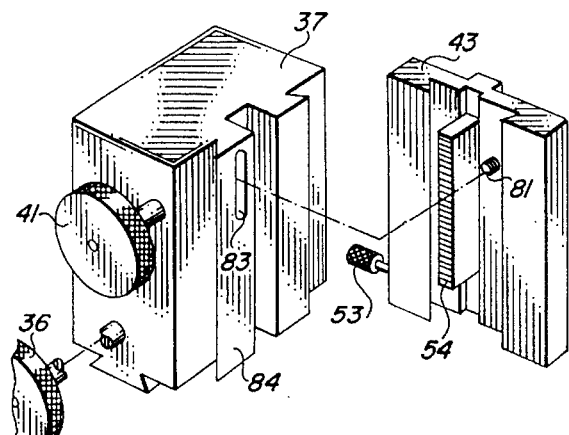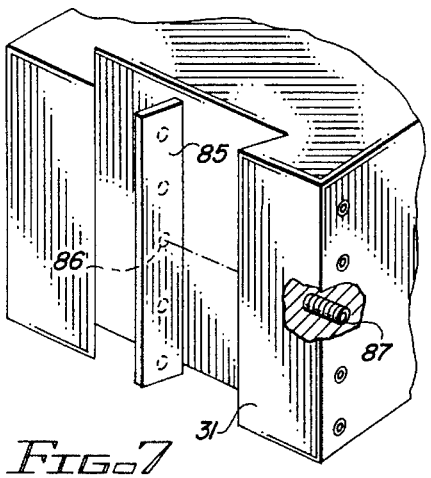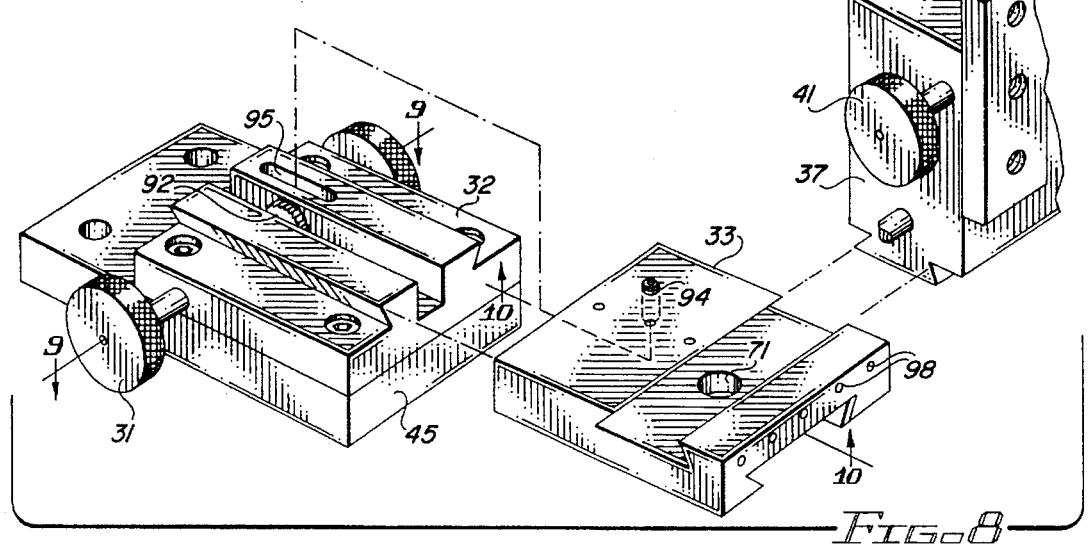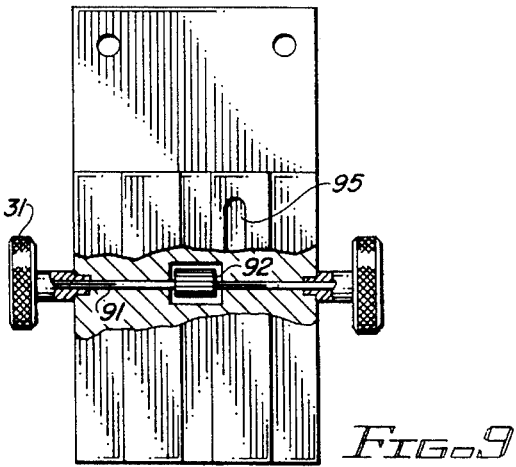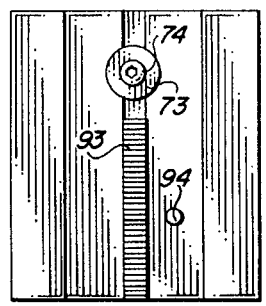

ERGONOMIC THREE AXIS POSITIONER

BACKGROUND OF THE INVENTION

This invention relates to a positioner for moving an article along three mutually perpendicular axes and, in particular, to a positioner wherein the controls for each axis are parallel and extend from the same side of the positioner.

Visual inspection of work in progress is used in many industries as part of a quality control process. In the semiconductor industry, for example, integrated circuits are inspected several times during manufacture to assure the accurate completion of each process step, e.g. wire bonding. Each inspection station includes a microscope positioned above a stage for receiving a workpiece and typically includes a positioner for moving the microscope relative to the stage along three axes.

Positioners having three axes of movement are well known in the art and are typified by the positioner disclosed in U.S. Pat. No. 3,046,006 (Kulicke, Jr.) in which fitted plates are moved relative to one another by three threaded adjustments. The plates move along three mutually perpendicular axes and the control knobs for each adjustment extend in three different directions from the positioner. This arrangement of the control knobs is not particularly convenient since one tends to grope for the correct knob while looking through the microscope. Further, the positioner is not as easy to use for a left-handed person as for a right-handed person.

A positioner having all control knobs on one side of the positioner is known in the art. U.S. Pat. No. 4,193,317 (Oono et al.) discloses a positioner in which the knobs for X-axis and Y-axis adjustments are attached to feedscrews engaging female threads attached to a stage. A knob for adjustment along the Z-axis is attached to a feedscrew engaging a cam for raising or lowering the stage. The knobs do not move the stage the same amount for a given amount of rotation of each knob and the range of motion along the Z-axis is much less than the range of motion along the X-axis and the Y-axis. The feedscrews are not parallel and the knobs are connected to the feedscrews by flexible couplings for redirecting the rotational motion of the knobs. Because the motion of the knobs is redirected within the positioner, only a single set of control knobs can be provided. Although the positioner disclosed in the Oono et al. patent appears suitable for its intended purpose, the positioner is not very rugged.

Since not all inspections use a horizontal stage, it is desirable to have a positioner which has interchangeable axes, i.e. the range and travel of the collar is the same in all axes of movement. With interchangeable axes, for example, one can hold a microscope or other inspection device horizontally rather than vertically and the operation of the positioner will feel the same as when the microscope is vertical.

In view of the foregoing, it is therefore an object of the invention to provide a rugged positioner having motion along three axes controlled by a set of knobs located on a single side of the positioner.

A further object of the invention is to provide a positioner having motion along three mutually perpendicular axes controlled by three parallel shafts.

Another object of the invention is to provide a positioner having dual controls on opposite sides of the positioner.

A further object of the invention is to provide a positioner having motion along three, interchangeable, mutually perpendicular axes.

Another object of the invention is to provide a positioner having motion along three mutually perpendicular axes controlled by three knobs all having the same travel, i.e. wherein rotating each knob causes the same amount of movement per turn of the knob.

A further object of the invention is to provide a positioner having the same ranges of motion in three mutually perpendicular axes.

Another object of the invention is to provide a positioner having motion along three mutually perpendicular axes wherein the motion along each axis can be locked.

SUMMARY OF THE INVENTION

The foregoing objects are achieved in the invention in which a positioner for moving an article along three mutually perpendicular axes includes a first slide coupled to a second slide by a first sliding joint, a third slide coupled to the second slide by a second sliding joint, and a base plate coupled to the third slide by a third sliding joint. The three sliding joints are mutually perpendicular. A first rack and pinion mechanism moves the first slide relative the second slide, a second rack and pinion mechanism moves the third slide relative to the base plate, and a carriage engaging a threaded shaft moves the second slide relative to the third slide. The pinion gears are mounted on shafts parallel to the threaded shaft and the three shafts extend from opposite sides of the positioner. A knob is attached to each end of the shafts for rotating the shafts to operate the positioner. The sliding joints are preferably dovetail joints, each of which includes a shim for adjusting the friction of the joint. Each joint preferably has the same range and travel as the other joints, thereby making the axes interchangeable.

BRIEF DESCRIPTION OF THE DRAWINGS

A more complete understanding of the invention can be obtained by considering the following detailed description in conjunction with the accompanying drawings, in which:

FIG. 1 illustrates an inspection station having a microscope mounted on a positioner constructed in accordance with the invention;

FIG. 2 illustrates the three axes of motion of a positioner constructed in accordance with the invention;

FIG. 3 is a partially cross-sectional top view of the upper portion of the positioner shown in FIG. 2;

FIG. 4 is a partially cross-sectional bottom view of the upper portion of the positioner shown in FIG. 2;

FIG. 5 is a partially cut-away front view of the upper portion of the positioner shown in FIG. 2;

FIG. 6 is an exploded view of the upper portion of the positioner shown in FIG. 2;

FIG. 7 illustrates the shimmed dovetail joint used in a positioner constructed in accordance with the invention;

FIG. 8 is an exploded view of the lower portion of the positioner shown in FIG. 2;

FIG. 9 is a partially cross-sectional view of the bottom plate of the positioner; and FIG. 10 is a bottom view of the slide which engages the bottom plate of the positioner.

DETAILED DESCRIPTION OF THE INVENTION

FIG. 1 illustrates an inspection station including base 11 having post 12 extending vertically from the base and having pedestal 13 attached to the post. Positioner 15 is attached to pedestal 13 and holds microscope 17 in collar 19 above base 11 for inspecting an article placed on the base. Pedestal 13 is vertically moveable along post 12 to provide a coarse adjustment of focus for microscope 17 and is held in place by setscrew 21. Setscrew 23 holds microscope 17 in place in collar 19.

Positioner 15 is adjustable along three, mutually perpendicular axes. These axes are arbitrarily designated as X, Y, and Z. For purposes of description, the Y-axis extends in a horizontal plane between post 15 and microscope 17; the X-axis extends in a horizontal plane perpendicular to the Y-axis; and the Z-axis extends in a vertical plane parallel to post 12.

Positioner 15 includes three slides and a bottom plate interconnected by three dovetail joints for motion along three axes. FIG. 2 shows the three axes of motion. Rotation of knob 31 moves slide 33 along the Y-axis, indicated by arrow 34, relative to bottom plate 32; i.e. knob 31 provides an in-and-out motion of collar 19 relative to post 12. Rotation of knob 36 moves slide 37 relative to slide 33 along the X-axis, indicated by arrow 39; i.e. knob 36 provides a side-to-side motion of collar 19. Rotation of knob 41 moves slide 43 relative to slide 37 along the Z-axis, indicated by arrow 44; i.e. knob 41 provides an up-and-down motion of collar 19. Bottom plate 45 is attached to base plate 32 by screws (not shown) and can be integral with base plate 32. A separate bottom plate is preferred to facilitate machining of the components.

Knobs 31 and 41 are coupled to shafts carrying pinion gears and knob 36 is coupled to a threaded shaft. The threaded shaft and the shafts for the pinion gears are parallel. This provides at least two advantages. A first advantage is that knobs 31, 36, and 41 are all on the same side of positioner 15. A second advantage is that the shafts can be extended and a second set of knobs connected to the shafts on the opposite side of positioner 15. For example, knob 46 is mounted on a common shaft with knob 41. Knobs 31 and 36 are also duplicated on the other side of positioner 15. This provides positioner 15 with a bilateral symmetry enabling the positioner to be manipulated by either hand with equal facility.

Collar 19 is attached to slide 43 by screw 47 and another screw (not labeled). Slide 43 includes a plurality of pairs of threaded holes for attaching collar 19 at different locations along the vertical face of the slide. Ridge 48 engages slot 49 in collar 19 to precisely locate the collar. If desired, the threaded holes can be suitably spaced in a matrix for attaching collar 19 horizontally (as shown) or vertically to the face of slide 43.

FIG. 3 is a top view of a positioner constructed in accordance with the invention, showing the mechanism for providing movement along the Z-axis. Slide 43 and slide 37 are interconnected by dovetail joint 51 which includes shim 52 on one side of the dovetail. Shim 52 extends the length of the joint and is held in place by several setscrews. In a preferred embodiment of the invention, thumbscrew 53 is used instead of one of the setscrews. Thumbscrew 53 can be tightened to lock slide 43 relative to slide 37 by pinching shim 52 against slide 37. This enables one to focus a microscope, for example, and to prevent the focus from being upset by motion in the X or Y direction or by inadvertent contact with knob 41 or knob 46.

Rack 54 is attached to slide 43 by a plurality of screws, such as screw 55. Pinion gear 57 engages rack 54 and rotates on shaft 58. Knobs 41 and 46 are attached to each end of shaft 58 by setscrews (not shown). Rotation of gear 57 causes rack 54 and slide 43 to move vertically relative to slide 37.

FIG. 4 is a bottom view of slides 43 and 37 and FIG. 5 is a partially cutaway front view of slides 43, 37, and 33. Referring to FIGS. 4 and 5, motion along the X-axis is provided by slides 33 and 37. Slide 37 is attached to slide 33 by ridge 59 which is the tail of a dovetail joint between slide 37 and slide 33. Ridge 59 includes central slot 60 which extends into the body of slide 37 to a predetermined depth. Shaft 61 extends through slide 37, intersecting slot 60, and includes threaded portion 63.

Carriage 64 is preferably a right circular cylinder having threaded bore 65 perpendicular to the longitudinal axis of the cylinder and engaging threaded portion 63. Carriage 64 includes a first diameter portion 67 (FIG. 5) and a reduced diameter portion 68 forming a pin on the lower end of the carriage fitting within hole 71 in slide 33. Screw 74 extends through washer 73 and through slide 33 from the side opposite carriage 64 to prevent the carriage from pulling out of hole 71. As knob 36 rotates shaft 61, carriage 64 is moved from one end of slot 60 to the other, thereby moving slide 37 (and slide 43) relative to slide 33.

Carriage 64 limits the amount of movement from side-to-side by engaging the ends of slot 60. The range of side-to-side movement is preferably the same as the range of vertical movement, e.g. 1.25 inches. This dimension is not critical and provides ample movement for inspecting small devices such as integrated circuits. It is also preferred that the pitch of the threads in threaded portion 63 causes carriage 64 to travel the same distance for a given rotation of knob 36 as slide 43 travels for a like rotation of knob 41. For example, if a one-quarter turn of knob 41 produces a travel of one-quarter of an inch, than a one-quarter turn of knob 36 preferably also produces a travel of one-quarter of an inch.

FIG. 6 illustrates a stop mechanism for motion along the Z-axis. In particular, setscrew 81 extends from a threaded hole in slide 43 to engage slot 83 in tail 84. As long as setscrew 81 extends into slot 83, the range of motion along the Z-axis is limited to the length of slot 83 (minus the diameter of setscrew 81). The threaded hole extends through slide 43 for access to setscrew 81 from outside the positioner.

FIG. 7 illustrates a detail of inserting a shim into a dovetail joint to control the friction of the joint. In FIG. 7, slide 33 straddles shim 85 having a plurality of dimples, such as dimple 86, for receiving a setscrew, such as setscrew 87, threaded into a hole through the side of slide 33. One of the setscrews could be replaced with a thumbscrew for securing slide 37 to slide 33.

FIG. 8 is an exploded view of the positioner showing the three mutually perpendicular sliding joints connecting base plate 32 and slides 33, 37, and 43. FIG. 9 is a top view of base plate 32 and FIG. 10 is a bottom view of slide 33. Referring to FIGS. 8, 9 and 10, base plate 32 includes knob 31 attached to shaft 91 for rotating pinion gear 92. Pinion gear 92 engages rack 93 attached to slide 33 by a plurality of screws. Setscrew 94 in slide 33 engages slot 95 in base plate 32 for limiting the motion along the Y-axis. Setscrews 98 control the friction of the joint between slide 33 and slide 37 by being tightened against a shim (not shown in FIGS. 8–10).

Shafts 58 (FIG. 3), 61 (FIG. 4) and 91 (FIG. 9) are parallel, preferably extend from opposites sides of the positioner, and have adjusting knobs attached at both ends thereof. This construction provides a rugged positioner which can be manipulated by either hand with equal ease. Motion along each axis can be locked, although a locking screw is preferably provided only for vertical movement.

Having thus described the invention, it will be apparent to those of skill in the art that various modifications can be made within the scope of the invention. For example, other sliding joints, such as a joint having a cross-section in the shape of a "T", can be used instead of a dovetail joint. Non-trapping joints, e.g. tongue and groove joints, can be used but the construction of the positioner is made more complicated by the need to fasten the slides together with sliding fittings. Not all of the sliding joints need be of the same type. The range and travel are preferably the same for all joints but can be modified to suit a particular need. The positioner can be made from any material, depending upon intended use. In one embodiment, slides 33, 43 and plate 45 were made from anodized aluminum with steel screws; setscrew 23 was made from Nylon, and slides 32, 37 and carriage 64 were made from Delrin plastic. The Delrin slides provide a self-lubricating function.

What is claimed is:

1. A positioner for moving an article along three mutually perpendicular axes, said positioner comprising:

a first slide for supporting said article;

a second slide coupled to said first slide by a first sliding joint;

a third slide coupled to said second slide by a second sliding joint;

a base plate coupled to said third slide by a third sliding joint;

a first rack and a first pinion gear interconnecting said first slide and said second slide, said first pinion gear mounted on a first shaft, wherein one of the first rack and the first shaft is mounted to one of the first slide and the second slide and the other of the first rack and the first shaft is mounted to the other of the first slide and the second slide;

a second rack and a second pinion gear interconnecting said third slide and said base plate, said second pinion gear mounted on a second shaft, wherein one of the second rack and the second shaft is mounted to one of the third slide and the base plate and the other of the second rack and the second shaft is mounted to the other of the third slide and the base plate;

a third shaft having a threaded portion and a carriage engaging said threaded portion, said carriage interconnecting said second slide and said third slide, wherein one of the second slide and the third slide includes a hole for receiving said carriage and the third shaft is mounted to the other of the second slide and the third slide;

wherein said first shaft, said second shaft, and said third shaft are parallel and extend from a first side of said positioner; and first, second, and third knobs attached one each to the ends of said first shaft, said second shaft, and said third shaft.

2. The positioner as set forth in claim 1 wherein said shafts also extend from a second side of said positioner and said second side is opposite said first side.

3. The positioner as set forth in claim 1 wherein each of the sliding joints has range of motion and the ranges of motion are equal.

4. The positioner as set forth in claim 1 wherein each slide is moved the same amount as the other slides for a given angular rotation of each of the knobs.

5. The positioner as set forth in claim 1 wherein at least one of said sliding joints includes a shim for controlling the friction of the joint.

6. The positioner as set forth in claim 1 wherein at least one of said sliding joints includes a thumbscrew for locking the joint.

7. The positioner as set forth in claim 1 and further comprising a collar for holding said article, wherein said collar is attached to one of said slides.

8. The positioner as set forth in claim 7 wherein said one of said slides includes a plurality of mounting holes for attaching said collar at different locations on the slide.

9. A positioner for moving an article along three mutually perpendicular axes, said positioner comprising:

a first slide adapted to hold said article;

a second slide coupled to said first slide by a first sliding joint;

a third slide coupled to said second slide by a second sliding joint;

a base plate coupled to said third slide by a third sliding joint;

wherein the three sliding joints are mutually perpendicular;

three parallel shafts, each having a first free end extending from a first side of said positioner and extending through said positioner to a second free end extending from a second side of said positioner, wherein said sides are opposite each other;

first means, coupled to a second of said three parallel shafts, for moving said first slide relative to said second slide;

second means, coupled to a second of said three parallel shafts, for moving said second slide relative to said third slide;

third means, coupled to a third of said three parallel shafts, for moving said third slide relative to said base;

first, second, third, fourth, fifth, and sixth knobs attached one each to the free ends of said three parallel shafts.

10. The positioner as set forth in claim 9 wherein each sliding joint has a travel and range and the travels and ranges of all the sliding joints are the same.

\* \* \* \* \*